Dec. 4, 1962 D. F. GARMAN 3,066,367

PANEL MOUNTING FASTENER

Filed May 23, 1957

INVENTOR.
DONALD F. GARMAN

BY Malcolm W. Fraser

ATTORNEY

United States Patent Office 3,066,367
Patented Dec. 4, 1962

3,066,367
PANEL MOUNTING FASTENER

Donald F. Garman, Toledo, Ohio, assignor, by mesne assignments, to The Bishop and Babcock Corporation, Cleveland, Ohio, a corporation of Ohio
Filed May 23, 1957, Ser. No. 661,201
3 Claims. (Cl. 24—81)

This invention relates to metallic fasteners of the type for use in connection with one flat panel or the like to another.

In accordance with the invention, a fastener or clip is provided with anchoring means enabling it be securely fixed to a support, such as a chassis panel of a radio receiver or the like. The fastener is of one-piece spring metal enabling it to be manufactured economically on a quantity production basis, and has a resilient arm on one end of which is the above anchoring means. At the opposite end of the arm is a head having a cam surface and a panel supporting portion, the arrangement being such that a flat panel carrying the electronic devices for example, is pushed over the cam surface to flex the arm outwardly until the supporting portion is encountered, whereupon the arm snaps back to normal position to engage the panel to be supported.

Other objects and features of the invention will hereinafter appear, and by way of illustration and not of limitation, embodiments of the invention are shown in the accompanying drawings in which FIGURE 1 is a top perspective view of a radio chassis along which is supported a panel carrying the electronic devices and secured in place by spring metal fasteners or clips in accordance with this invention;

Figure 1:
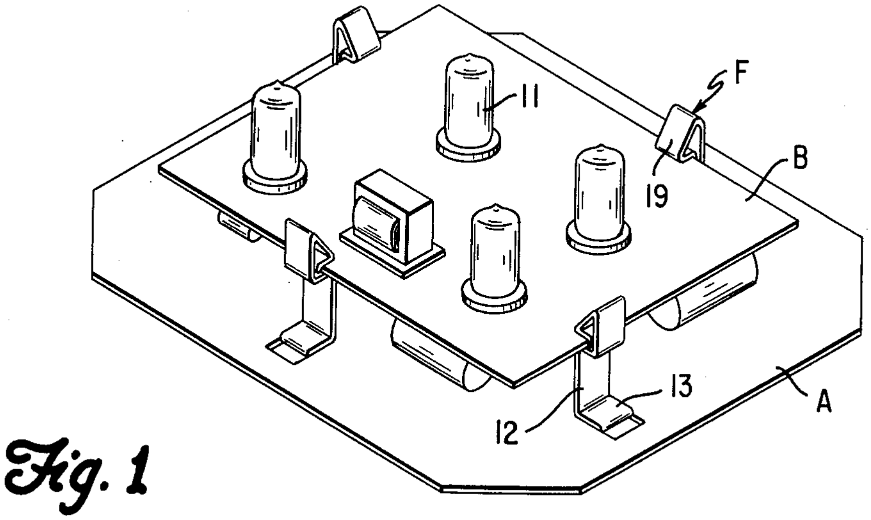

The illustrated embodiment of the invention comprises a sheet metal supporting panel or chassis A which may be the chassis of a radio receiver and as shown supported in spaced relation above the panel A is a plastic panel B which may have on the under surface (FIGURE 6) a printed circuit 10 and which carries suitable electronic devices 11 on the upper side thereof, such as used in radio receivers and the like. The panel B is supported on the chassis A by a series of clips or fasteners F which in this instance are of spring sheet metal. As shown, the panel B is rectangular in form and four fasteners F suffice for the mounting thereof.

Each fastener F comprises an elongate upright arm 12 and at the lower end of the arm 12 and disposed at right angels thereto is an anchoring means in the form of a hook 13. It will be noted that the hook is disposed at one side of the arm 12 and at right angles thereto and is adapted to hook into an assembly opening 14 in the chassis panel A. Adjacent the opening 14 which in this instance is rectangular in shape is a round hole 15. Struck from the lower arm of the hook 13 is an upwardly inclined detent 16 to snap into the hole 15 and engage an edge thereof for preventing movement of the hook out of engagement with the chassis A and thereby securely anchoring the fastener or clip F in place on the supporting or chassis panel A.

At the upper end of the spring arm 12 is a head having a ledge portion 17 integral with and extending outwardly at right angles from the arm 12 and overlying the hook 13. Integral with the outer edge of the ledge portion 17 is an upright extension which is in this instance parallel to the arm 12 and integral with the upper end of the extension 18 is a downwardly and inwardly inclined cam surface portion 19. The cam portion 19 terminates slightly above the ledge portion 17 and in substantial alignment with the arm 12. Integral with the lower end of the cam surface portion 19 is a terminal portion 20 which extends toward the extension 18 and substantially parallel to the ledge portion 17 providing a space between the terminal portion 20 and the ledge portion 17. The terminal portion terminates short of the extension 18 and has an integral downturned hook or lip 21.

From the above description it will be apparent that with the fasteners F in place on the supporting or chassis panel A, the panel B may be forced downwardly in flatwise fashion over the cam surfaces 19 which thereby flex the arms 12 outwardly until the lower ends of the cam surfaces have been passed enabling the arm 12 to snap back to its normal position and enable the edge portions of the panel B to enter the space between the terminal portions 20 and the ledge portions 17 of the fasteners. The downturned lip 21 on each of the fasteners serves to limit the movement of the edge portions of the panel B, thereby providing a stop.

Figures 2, 3, 4, 5, 6:
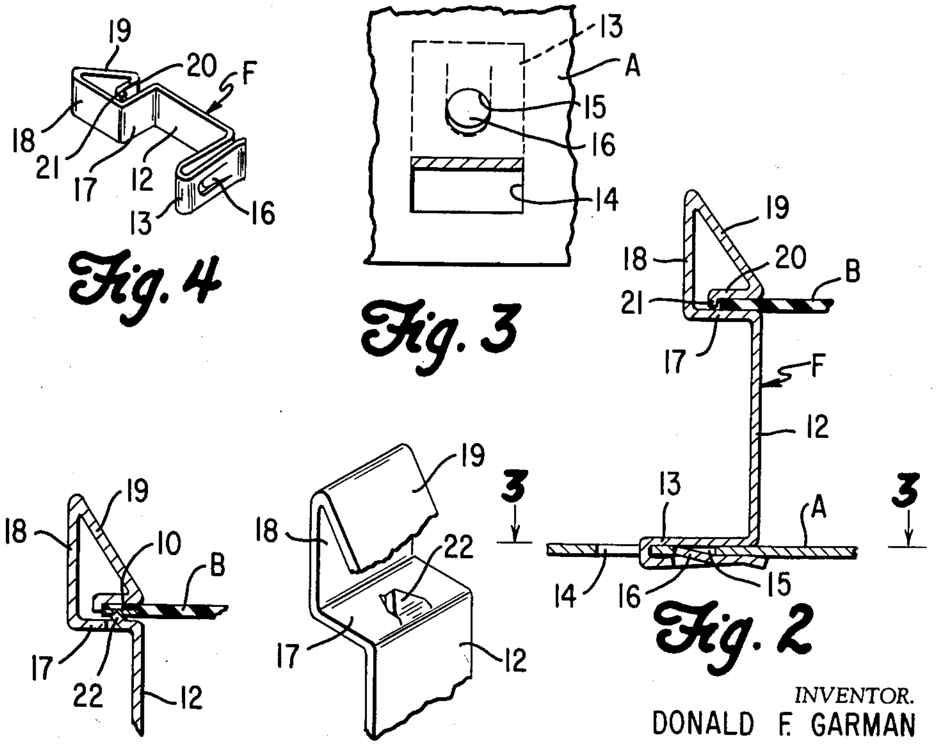
FIGURE 2 is an enlarged fragmentary sectional view taken through one of the fasteners and showing the same mounted to the chassis panel and carrying the panel to be supported.
FIGURE 3 is a sectional view substantially on the line 3—3 of FIGURE 2.
FIGURE 4 is a perspective view of one of the fasteners.
FIGURE 5 is an enlarged fragmentary sectional view of an alternate form embodying a tooth to bite into the panel to be supported for grounding the printed circuit in such panel.
FIGURE 6 is a sectional view of the fasteners portion shown in FIGURE 5 and illustrating the biting action of the tooth to engage and ground the printed circuit in the panel being supported.

As shown in FIGURES 5 and 6 an upwardly struck pointed tooth 22 may be provided in the ledge portion 17 of the fastener, thereby to contact a portion of the printed circuit 10 usually formed in the underside of the panel B and to provide a ground for such circuit. Thus automatically when the panel B is mounted in place, the circuit is grounded.

Numerous changes in details of construction, arrangement and choice of materials may be effected without departing from the spirit of the invention, especially as defined in the appended claims.

What I claim is:

1. A stand-off panel mounting fastener for mounting a supported panel spaced above a supporting panel comprising a one piece spring metal body having an upright arm, means at the lower end only of said arm for anchoring same to a supporting panel whereby said arm extends freely above said supporting panel, an integral ledge portion on the upper end of said arm extending outwardly at substantially right angles therefrom and against which an end portion of a supported panel is adapted to rest, an upward extension integral with the outer end of said ledge portion and disposed approximately parallel to said arm, a cam portion on the upper end of said extension, said cam portion overlying said ledge portion and inclining downwardly and inwardly from the upper end of the extension and terminating slightly above said ledge portion, and a terminal portion integral with the free end of said cam portion disposed generally parallel to and spaced slightly from said ledge portion, whereby said arm is flexed outwardly by forcing an end portion of the supported panel against said cam portion in a direction toward the ledge portion thereby to admit such end portion between said cam portion and ledge portion after which the arm flexes inwardly to retain the supported panel.

2. A stand-off panel mounting fastener for mounting a supported panel spaced above a supporting panel comprising a one piece spring metal body having an upright arm, means at the lower end only of said arm for anchoring same to a supporting panel whereby said arm extends freely above said supporting panel, an integral ledge portion on the upper end of said arm extending outwardly at substantially right angles therefrom and against which an end portion of a supported panel is adapted to rest, an upward extension integral with the outer end of said ledge portion and disposed approximately parallel to said arm, a cam portion on the upper end of said extension, said cam portion overlying said ledge portion and inclining downwardly and inwardly from the upper end of the extension and terminating slightly above said ledge portion, a terminal portion integral with the free end of said cam portion disposed generally parallel to and spaced slightly from said ledge portion, and a lip on the free end of said terminal portion extending toward said ledge portion providing a limiting stop for the supported panel end, whereby said arm is flexed outwardly by forcing an end portion of the supported panel against said cam portion in a direction toward the ledge portion thereby to admit such end portion between said cam portion and ledge portion after which the arm flexes inwardly to retain the supported panel.

3. A stand-off panel mounting fastener for mounting a supported panel spaced above a supporting panel comprising a one piece spring metal body having an upright arm, means at the lower end only of said arm for anchoring same to a supporting panel whereby said arm extends freely above said supporting panel, an integral laterally extending ledge portion on the upper end of said arm against which an end portion of a supported panel is adapted to rest, an upward extension integral with the outer end of said ledge portion, a cam portion on the upper end of said extension, said cam portion inclining downwardly and inwardly from the upper end of the extension and terminating slightly above said ledge portion, whereby said arm is flexed outwardly by forcing an end portion of the supported panel against said cam portion in a direction toward the ledge portion thereby to admit such end portion between said cam portion and ledge portion after which the arm flexes inwardly to retain the supported panel, and a tooth struck from said ledge portion and projecting outwardly to bite into the supported panel.

References Cited in the file of this patent

UNITED STATES PATENTS

| | | |
|---|---|---|
| 2,184,255 | Kral | Dec. 19, 1939 |
| 2,192,160 | Tinnerman | Feb. 27, 1940 |
| 2,618,086 | Komorous | Nov. 18, 1952 |
| 2,740,097 | Edelman et al. | Mar. 27, 1956 |
| 2,765,397 | Harris | Oct. 2, 1956 |
| 2,801,689 | Toti | Aug. 6, 1957 |